May 7, 1929.    G. FORNACA    1,711,881
WHEEL SUSPENSION MEANS FOR MOTOR VEHICLES
Filed July 13, 1927    2 Sheets-Sheet 1
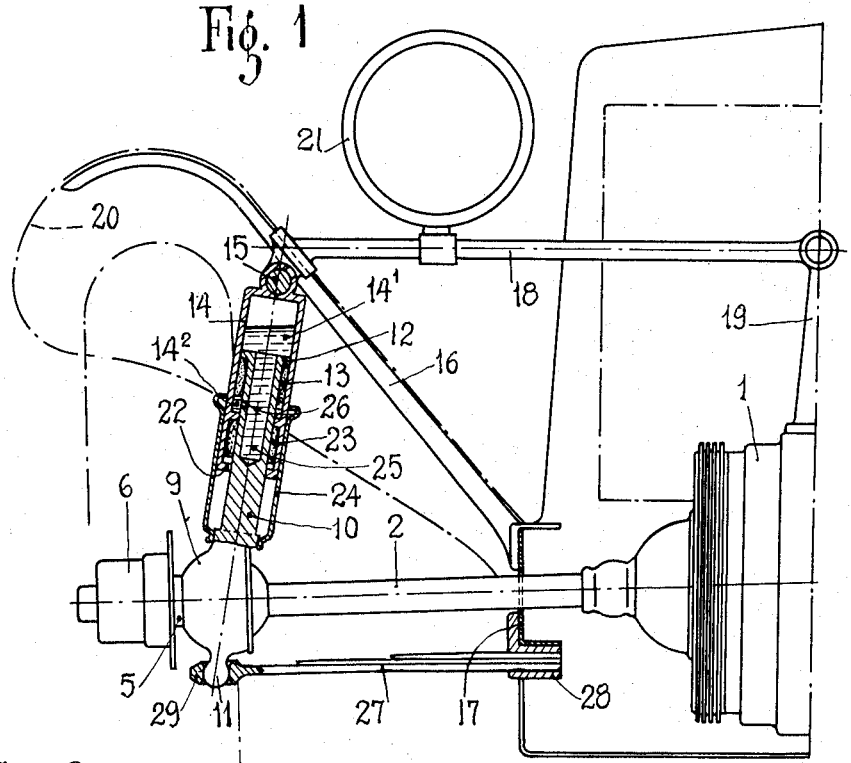
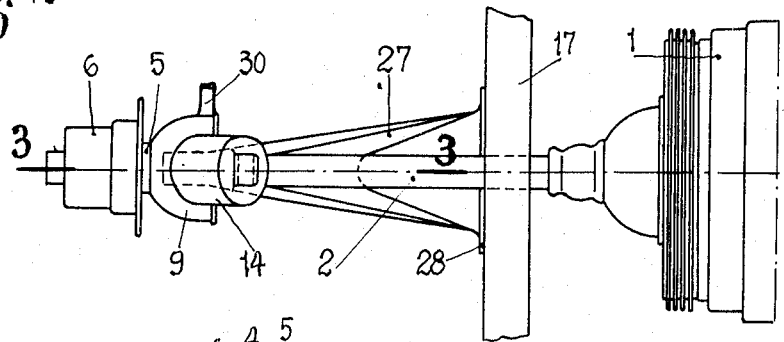
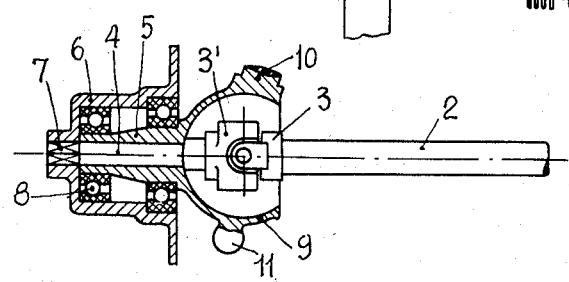
Inventor:
Guido Fornaca
By Emil Bonnelycke
Attorney

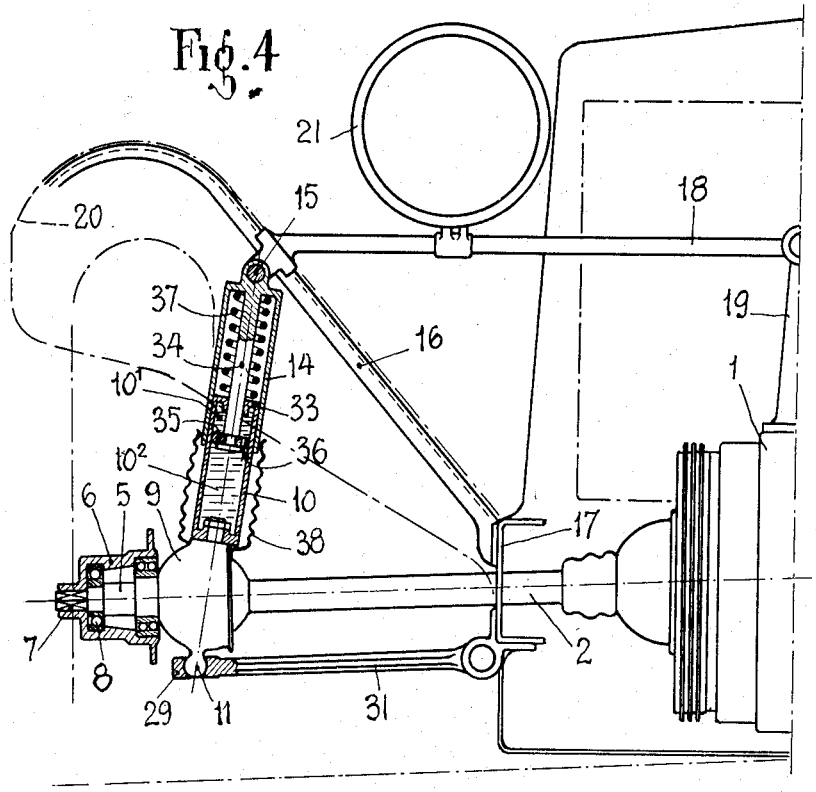
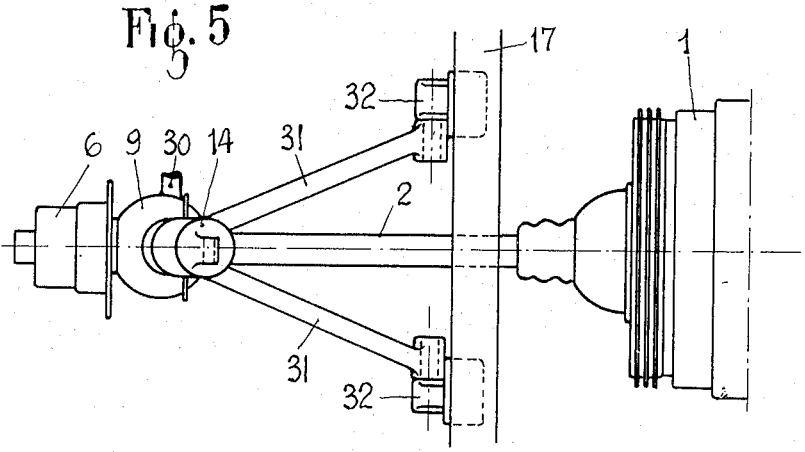

Patented May 7, 1929.

1,711,881

UNITED STATES PATENT OFFICE.

GUIDO FORNACA, OF TURIN, ITALY.

WHEEL-SUSPENSION MEANS FOR MOTOR VEHICLES.

Application filed July 13, 1927, Serial No. 205,459, and in Italy July 16, 1926.

This invention relates to suspension means for vehicles and more particularly to resilient suspension means for driving and steering wheels of motor vehicles.

An object of this invention is to provide an improved suspension in which each wheel is carried by a member which in turn is connected with the vehicle frame by means comprising a substantially inextensible member as a rod or a leaf spring, and a resilient member adapted to yield in the direction of the oscillations of the wheel with respect to the vehicle, said resilient member being connected with the vehicle frame at a point located at a vertical distance with respect to said inextensible member.

Another object of this invention is to provide a suspension of the kind above referred to in which said wheel carrying member comprises a swivel member and said longitudinally resilient member provides for steering movement of said swivel.

Another object is to provide a shock damper or absorber which includes resilient suspension means and which is adapted to be embodied in a wheel suspension of the type above referred to.

Another object of this invention is the provision of driving means for vehicle wheels mounted by the suspension means hereinafter described and a further object is the provision of an arrangement for attaching the end of said resilient member, said arrangement comprising a rigid structure which includes a mud-guard supporting bracket and a stiffening cross bar which also acts to support the vehicle headlights.

In the annexed drawings are shown by way of example two constructions of suspensions according to this invention, and Figure 1 is a front elevation with parts in section of one embodiment of this invention, Figure 2 is a fragmentary plan view of the same with parts removed, Figure 3 is a fragmentary section on line 3—3 of Fig. 2, to an enlarged scale;

Figure 4 is a front view of a modified construction with parts in section and

Figure 5 is a fragmentary plan view of Figure 4 with parts omitted.

In the embodiment of Figures 1, 2 and 3, 1 is the differential casing of a motor vehicle from which extends on each side a shaft 2 coupled at its inner end with the differential gear by means of a Cardan or flexible joint (not shown) and intended to drive a wheel. Only one single shaft 2 is shown on the drawing, the figures of said drawing being fragmentary views of the motor vehicle.

The outer end of shaft 2 is connected by means of a flexible or Cardan joint 3—3' with a stub shaft 4 which is journalled in a bored swivel member 5 and has a square-section portion 7 for drive connection with a wheel hub 6 mounted rotatably on said swivel member 5 by means of ball bearings 8. Said bored swivel 5 provides an enlarged hollow head 9 enclosing the joint 3—3' and having a top trunnion 10 and a bottom ball trunnion 11, said trunnions 10—11 being aligned on a common axis passing through the centre of the joint 3—3' and providing for steering oscillation of the swivel member 5—9 and wheel mounted thereon; said wheel is shown diagrammatically in dotted outline in Figure 1.

The top trunnion 10 provides a piston 12 having a packing 13 and arranged to rotate and reciprocate within a cylinder 14 which is pivoted at 15 on a rigid structure comprising a bracket 16 fastened on the vehicle frame 17 and a cross bar 18 extending transverse to the vehicle; said cross bar 18 is connected by an upright 19 with the differential gear casing 1, this casing being in turn fastened on the vehicle frame.

Said bracket 16 and cross bar 18 are conveniently availed of for supporting the mud guard 20 for the wheel (shown in dotted outline to leave in view the parts under it) and the vehicle headlight 21, as illustrated.

The cylinder 14 is provided near its mouth with inturned flanges 22 between which a packing ring 23 is located.

An outer telescoping cover or protecting cylinder 24 rigidly connected with trunnion 10 embraces said cylinder 14 for protecting purposes.

The piston 12 of trunnion 10 provides in cylinder 14 two spaces or chambers $14^1$ and $14^2$ which communicate with each other through a central bore 25 of trunnion 10 and one or more small orifices 26 provided in the bored portion of said trunnion.

In chambers $14^1$—$14^2$ of cylinder 14 is enclosed a charge of liquid as oil, glycerine, or the like, which leaves a free air chamber or space above it in chamber $14^1$.

Under shaft 2 and parallel with the same extends a spring 27 having its root fastened at 28 on the vehicle frame 17 and formed at its free end with a collar 29 providing a bearing for the ball trunnion 11 of the swivel 5, said collar being provided with means (not shown) for insertion and engagement therein of said ball trunnion 11.

As shown in Figure 2, the leaves of the spring 27 have a comparatively large width as measured in the direction of the longitudinal axis of the vehicle, to support stresses acting parallel to said axis.

The swivel 5 is provided with an arm 30 connected with a steering gear of any suitable conventional design (not shown) for imparting steering movements and holding it in the desired position.

In operation the load is mainly supported by the spring 27 while the oscillations of the wheel and associated parts are damped by the damper provided by the cooperating trunnion and piston 10—12 and cylinder 14.

On vertical oscillations of the wheel occurring, the piston 12 is caused to reciprocate in cylinder 14 and the liquid enclosed therein is caused to flow from and into each chamber $14^1$ and $14^2$ through the orifice or orifices 26, the respective motion of parts 10—12 and 14 being damped by the resistance of said liquid to its throttled flow.

Further said damper acts also as a resilient suspension, because the variations in capacities of chambers $14^1$—$14^2$ are not entirely reciprocal and therefore a compression is produced in the air cushion above the liquid in the top chamber.

In the embodiment of Figures 4 and 5 the swivel member 5 has its ball trunnion 11 engaged in a collar 29 formed on the adjacent ends of V-arranged bars 31—31, the other ends of these bars being arranged to rotate on supports or hinges 32 fastened at a longitudinal distance from each other along the vehicle frame 17. The trunnion 10 of the swivel 5 is hollow and is mounted to reciprocate and rotate in a cylinder 14 pivoted at 15 on the rigid structure 16—18 as above described, and it has an end perforated cover 33 through which extends a stem 34 integral with the cylinder 14 and carrying a piston 35 providing two chambers $10^1$—$10^2$ in said hollow trunnion 10, said chambers communicating with each other through a restricted orifice 36 of piston 35.

A spring 37 is located in cylinder 14 intermediate the head of said cylinder and the cover 33 of hollow trunnion 10 and a mudguard 38 is provided on the swivel member 5 to protect the movable parts.

In operation the V-arranged bars 31—31 withstand longitudinal stresses acting on the wheel and they are free to oscillate vertically around the common axis of aligned hinges 32—32, the said oscillations being damped by the spring 37 and by the resistance of the liquid enclosed in chambers $10^1$—$10^2$ to its flow through the restricted or throttling orifice 36 of the piston 35 which separates said chambers.

In this construction the suspended load is thus supported by spring 37 while the oscillations are damped by the described liquid damper.

Of course the present invention is not restricted to the precise embodiments described and illustrated, but includes all the constructions lying within the scope of the appended claims.

What I claim as my invention and desire to secure by United States Letters Patent is:—

1. A mounting for vehicle wheels comprising a leaf spring extending transverse to the vehicle frame for vertical oscillation and having its root fastened thereon, the leaves of said spring having a decreasing width from their root towards their free end, a wheel carrier supported by the free end of said spring, a wheel hub supported by said carrier, means including a driving shaft and flexible joints for driving said wheel hub, a rigid structure fastened on the vehicle frame at a vertical distance from said transverse member, and a shock absorber connected with said structure and wheel hub carrier.

2. A mounting for vehicle wheels comprising a member extending transverse to the vehicle frame and having one end connected therewith for vertical oscillation, a swivel member pivoted for steering movement in the other end of said member, a wheel hub supported by said swivel member, means including a driving shaft and flexible joints for driving said wheel hub, a rigid structure fastened on the vehicle frame at a vertical distance from said transverse member, a cylindrical member pivoted on said rigid structure, a second cylindrical member rigid with said swivel member, said cylindrical members being engaged with each other for relative longitudinal and rotary movements along and around an axis passing through the pivot point of said swivel member in said transverse member, and means for damping the relative longitudinal movements of said cylindrical members.

3. A mounting for vehicle wheels comprising a member extending transverse to the vehicle frame and having one end connected therewith for vertical oscillation, a swivel member pivoted for steering movement in the other end of said member and providing a hollow cover, a wheel hub supported by said swivel member, means including a driving shaft and a flexible joint for driving said wheel hub, said joint being located in said hollow cover, a rigid structure fastened on the vehicle frame at a vertical distance from said transverse member, a cylindrical member pivoted on said rigid structure, a second cylindrical member rigid with said swivel member, said cylindrical members being engaged with each other for relative longitudinal and rotary movements along and around an axis passing through the pivot point of said swivel member in said transverse member, and means for damping the relative longitudinal movements of said cylindrical members.

4. A mounting for vehicle wheels comprising a member extending transverse to the vehicle frame and having one end connected therewith for vertical oscillation, a swivel member for steering movement on the other end of said member, a wheel hub supported by said swivel member, means including a driving shaft and flexible joints for driving said wheel hub, a rigid structure fastened on the vehicle frame at a vertical distance from said transverse member, said structure including a mud-guard bracket, a cylindrical member pivoted on said rigid structure, a second cylindrical member rigid with said swivel member, said cylindrical members being engaged with each other for relative longitudinal and rotary movements along and around an axis passing through the pivot point of said swivel member in said transverse member, and means for damping the relative longitudinal movements of said cylindrical members.

5. A mounting for vehicle wheels comprising a member extending transverse to the vehicle frame and connected therewith for vertical oscillation, a swivel member mounted for steering movement in the free end of said member, a wheel hub supported by said swivel member, means including a driving shaft and flexible joints for driving said wheel hub, a rigid structure fastened on the vehicle frame at a vertical distance from said transverse member, said structure including a mud-guard bracket and a headlight-supporting cross bar, a cylindrical member pivoted on said rigid structure, a second cylindrical member rigid with said swivel member, said cylindrical members being engaged with each other for relative longitudinal and rotary movement along and around an axis passing through the pivot point of said swivel member in said transverse member, and means for damping the relative longitudinal movements of said cylindrical members.

6. A mounting for vehicle wheels comprising a member extending transverse to the vehicle frame and having one end connected therewith for vertical oscillation, a swivel member pivoted for steering movement in the other end of said member, a wheel hub supported by said swivel member, means including a driving shaft and flexible joints for driving said wheel hub, a rigid structure fastened on the vehicle frame at a vertical distance from said transverse member, a cylindrical member pivoted on said rigid structure, a second cylindrical member rigid with said swivel member, said cylindrical members being engaged with each other for relative longitudinal and rotary movements along and around an axis passing through the pivot point of said swivel member in said transverse member, and cooperating partitions in said cylindrical members providing variable chambers containing a fluid and having a throttled communication with each other.

7. A mounting for vehicle wheels comprising a member extending transverse to the vehicle frame and having one end connected therewith for vertical oscillation, a swivel member pivoted for steering movement in the other end of said member, a wheel hub supported by said swivel member, means including a driving shaft and flexible joints for driving said wheel hub, a rigid structure fastened on the vehicle frame at a vertical distance from said transverse member, a cylindrical member pivoted on said rigid structure,, a second cylindrical member rigid with said swivel member, said cylindrical members being engaged with each other for relative longitudinal and rotary movements along and around an axis passing through the pivot point of said swivel member in said transverse member, cooperating partitions in said cylindrical members providing variable chambers having a throttled communication with each other and containing a fluid, and spring load supporting means intermediate said cylindrical members.

8. A mounting for vehicle wheels comprising a member extending transverse to the vehicle frame and having one end connected therewith for vertical oscillation, a swivel member pivoted for steering movement in the other end of said member, a wheel hub supported by said swivel member, means including a driving shaft and flexible joints for driving said wheel hub, a rigid structure fastened on the vehicle frame at a vertical distance from said transverse member, a cylindrical member pivoted on said rigid structure, a second cylindrical member rigid with said swivel member, said cylindrical members being engaged with each other for relative longitudinal and rotary movements along and around an axis passing through the pivot point of said swivel member in said transverse member, cooperating partitions in said cylindrical members providing variable chambers having a throttled communication with each other and containing a fluid, and an air cushion above said fluid.

9. A mounting for vehicle wheels comprising a member extending transverse to the vehicle frame and having one end connected therewith for vertical oscillation, a swivel member pivoted for steering movement in the other end of said member, a wheel hub supported by said swivel member, means including a driving shaft and flexible joints for driving said wheel hub, a rigid structure fastened on the vehicle frame at a vertical distance from said transverse member, a cylindrical member pivoted on said rigid structure, a second cylindrical member rigid with said swivel member, said cylindrical members being engaged with each other for relative longitudinal and rotary movements along and around an axis passing through the pivot point of said swivel member in said transverse member, means for damping the relative longitudinal movements of said cylindrical members, and protecting means cooperating with said cylindrical members.

In testimony whereof I affix my signature.

GUIDO FORNACA.